United States Patent [19]

Oberg et al.

[11] Patent Number: 5,324,913
[45] Date of Patent: Jun. 28, 1994

[54] METHOD AND APPARATUS FOR LASER WELDING

[75] Inventors: Gary R. Oberg, Darwin; William D. Shnowske, Eden Prairie, both of Minn.

[73] Assignee: Spectralytics, Inc., Litchfield, Minn.

[21] Appl. No.: 910,772

[22] Filed: Jul. 8, 1992

[51] Int. Cl.$^5$ ............................................. B23K 26/00
[52] U.S. Cl. .......................... 219/121.63; 219/121.64
[58] Field of Search ....................... 219/121.63, 121.64

[56] References Cited

U.S. PATENT DOCUMENTS

| | | | |
|---|---|---|---|
| 4,697,061 | 9/1987 | Spater et al. | 219/121.64 |
| 4,847,467 | 7/1989 | Ausilio | 219/121.63 |
| 4,959,522 | 9/1990 | Rossi | 219/121.75 |
| 5,194,710 | 3/1993 | McDaniel et al. | 219/121.63 |

Primary Examiner—C. L. Albritton
Attorney, Agent, or Firm—James W. Miller

[57] ABSTRACT

A laser welding apparatus and method utilizes a pressure foot carried on a laser welder as the laser welder traverses an elongated weld line. The foot is L-shaped comprising a vertical mounting leg for attachment to the welder and a horizontal pressure plate at the lower end of the mounting leg. The pressure plate includes a cylindrical bearing element that creates a contact area with the items being welded that closely surrounds the weld site being contacted by the laser beam. At least one adjustable biasing unit forces the pressure plate into engagement with the items being welded to tightly press such items against an underlying support surface to cause close contact of the items only adjacent the weld site. Since the pressure foot is carried on the welder, the contact area of the pressure foot will move in concert with relative motion between the welder and the support surface to traverse along the weld line. No other clamps are used.

19 Claims, 2 Drawing Sheets

METHOD AND APPARATUS FOR LASER WELDING

TECHNICAL FIELD

This invention relates to a method and an apparatus for laser welding and, more particularly, to a pressure foot for applying pressure against the items being welded to force them into close contact with one another.

BACKGROUND OF THE INVENTION

Welding systems are known using a laser beam as the energy source for welding various metallic items together. Such a system includes a downwardly directed laser beam and a horizontal worktable on which the work is supported. In many cases, the desired weld is to be formed along a continuous, elongated line. Relative motion between the laser beam and the work is thus required. Either the laser beam is movably mounted to traverse along the weld line or the worktable is movable to cause the weld line to pass beneath a stationary laser beam.

The assignee of this invention has previously used a laser welding system of this type to join together two superimposed metallic sheets. These sheets when joined together form one fin in a heat exchange unit. The joined sheets provide a fin having a central array of corrugated, cooling passages through which a fluid may be passed in a heat exchange relationship with a medium flowing along the outside of the fin. A particular heat exchange unit normally includes a large number of these fins spaced slightly apart so that the heat exchange medium will flow down along both sides of each fin. Heat exchangers of this type are often submersed in water, such as sea water, for cooling heated fluids, such as power plant fluids, that are passed through the cooling passages in the fins.

In making each fin for such a heat exchange unit, a continuous elongated weld is required to join together the two separate metallic sheets that form the fin. This weld line encircles the central array of corrugated cooling passages to prevent any leakage of the fluids contained in those passages. This weld has been formed by the assignee of this invention by moving the laser source relative to the worktable along the weld line in a continuous fashion from one end of the weld line to the other.

One problem associated with the prior known laser welding systems, including those used and known by the Applicants in welding fins for heat exchangers, is the need to firmly clamp the two metallic sheets together. This has conventionally been done by a large number of clamps, or one solid top clamp with a large number of bolts, that surround the peripheral edges of the metallic sheets to clamp them tightly along the entire length of the weld line. This is difficult and time consuming to set up and requires many clamps, or bolts, to effect close contact between the metal sheets. The time and labor involved in the clamping operation raises the costs of producing the fins. Moreover, it is not uncommon for the sheets to sometimes be separated by at least a small gap along at least a portion of the weld line, despite the presence of the clamps, leaving a weaker or non-hermetic weld at that point. This is also obviously undesirable.

SUMMARY OF THIS INVENTION

One aspect of this invention is to provide a method and an apparatus for laser welding which is able to maintain close contact between the items being welded along the length of an elongated weld line without requiring a complicated clamp array on the peripheral edges of the sheets being welded.

The present invention relates to an improved apparatus for laser welding at least two metallic items which are at least partially superimposed on top of one another to be overlapped along an elongated weld line. The apparatus is of the type having a laser welder which projects a laser beam in a first direction against a support surface upon which the metallic items being welded are supported with the support surface being generally perpendicular to the first direction of the laser beam. A means is provided for imparting relative motion between the support surface and the laser beam to allow the laser beam to move along the elongated weld line to weld the items together along the length of the weld line. In addition, a means is also provided for clamping the metallic items against the support surface to provide intimate contact between the items along the weld line. The improvement of this invention relates to the clamping means and comprises means for pressing the superimposed metallic items firmly against the support surface in a contact area adjacent the laser beam to force the items being welded into uniform intimate contact with one another adjacent a weld site comprising the point at which the laser beam is then contacting the weld line. The pressing means is carried on the laser welder to be movable in concert with the relative motion between the laser welder and the support surface such that the contact area provided by the pressing means traverses over the elongated weld line as the relative motion between the laser welder and the support surface occurs.

This invention also relates to a method of laser welding using this apparatus, and to the pressure foot which forms a part of the overall apparatus.

BRIEF DESCRIPTION OF THE DRAWINGS

This invention will be described more completely in the following Detailed Description, when taken in conjunction with the following drawings, in which like referenced numerals refer to like elements throughout.

DETAILED DESCRIPTION

Figure 1:
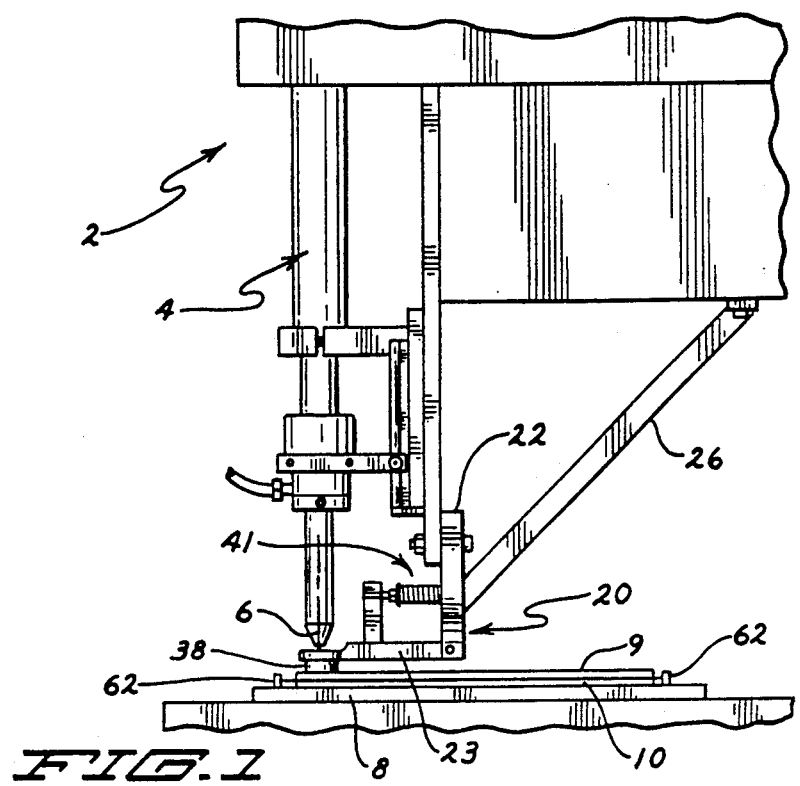
FIG. 1 is a side elevational view of an improved laser welding apparatus according to this invention, particularly illustrating the improved pressure foot of this invention attached to a laser welder to provide close contact between the items to be welded in a contact area only adjacent the weld site.
Figure 3:
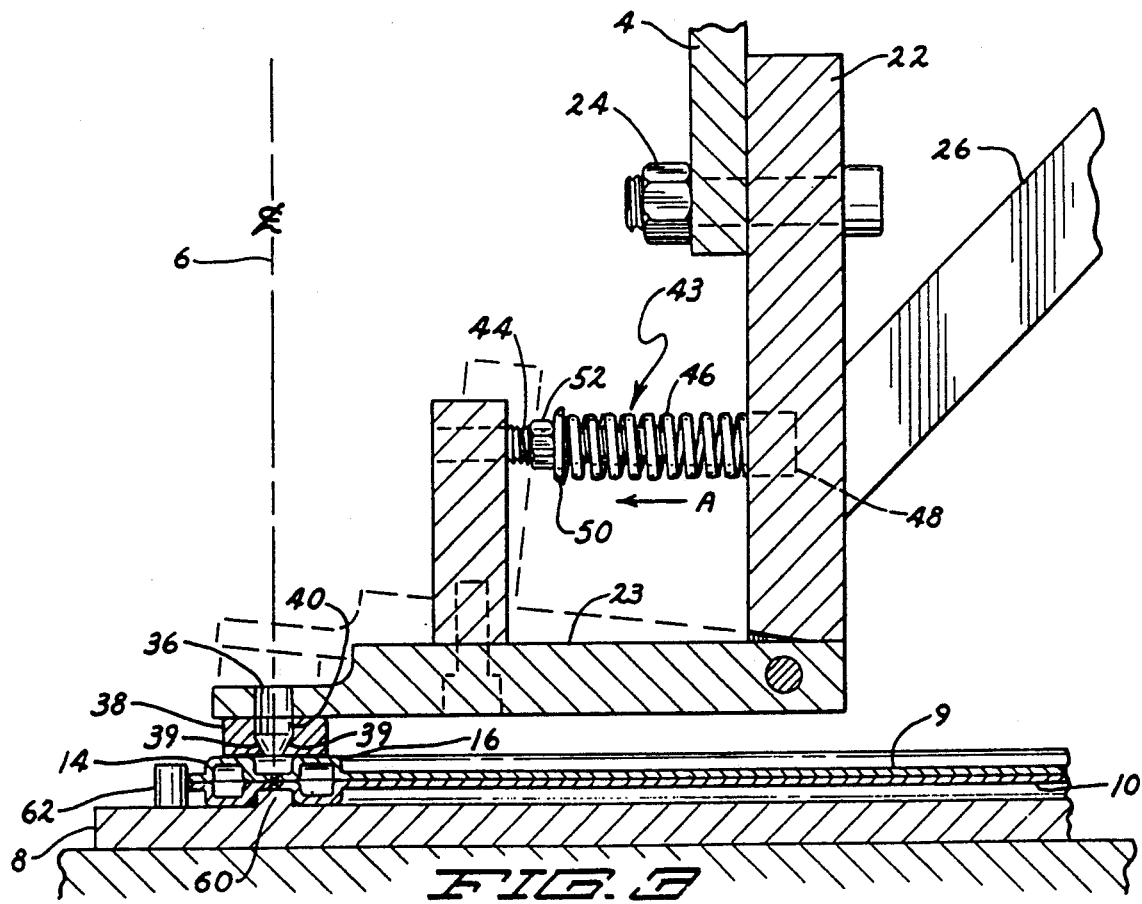
FIG. 3 is a cross-sectional view of the improved pressure foot of this invention taken along lines 3—3 in FIG. 2.

Referring first to FIG. 1, a laser welding apparatus of a type well known in the art is illustrated generally as 2. Apparatus 2 includes a laser welder 4 having a laser source and optical focusing mechanism for projecting a downwardly directed laser beam 6 against a generally horizontal worktable or support surface 8. Laser beam 6 is illustrated in FIGS. 1 and 3 by the line labelled 6 which represents the centerline of the laser beam projected from laser welder 4. The items to be welded are typically laid on top of support surface 8 and clamped together in some fashion so that laser beam 6 will be directed against the items to weld them together.

The items being welded often comprise superimposed metallic sheets 9 and 10 which are stacked on top of one another. For example, sheets 9 and 10 can comprise the metallic sheets which form a heat exchange cooling fin of the type described in the Background of the Invention section of this application. Such sheets 9 and 10 are to be joined together along an elongated weld line, depicted as 12 in FIGS. 2 and 3, that extends around the periphery of sheets 9 and 10 to seal a central array of cooling passages (not shown) in a fluid tight manner. Weld line 12 is shown located in a small channel 15 formed between abutting ridges 14 and 16 on the peripheral edges of sheets 9 and 10.

The exact nature of the product being welded, the exact shape of sheets 9 and 10, and the exact shape and configuration of the peripheral edges of sheets 9 and 10 is not an essential part of this invention. In fact, it is not necessary that sheets 9 and 10 be completely superimposed or overlaid on top of one another. Sheets 9 and 10 could be only partially overlaid so that they are overlapped only along weld line 12. For example, weld line 12 could comprise a seam in a can formed by overlapping the side edges of a single metallic sheet along the seam line such that the side edges of the single metallic sheet each correspond to one of sheets 9 and 10. Thus, this invention is useful in welding along a continuous, elongated weld line 12 when the items being welded are at least partially overlapped along weld line 12.

As noted, laser welder 4 is set up to create a continuous weld along an elongated weld line 12. In this situation, relative motion in an x-y plane has to occur between laser beam 6 and support surface 8. This can be accomplished either by movably mounting laser welder 4 such that welder 4 itself moves to cause beam 6 to travel along the length of weld line 12, or by having support surface 8 comprise a movable worktable which is moved back and forth beneath a stationary laser beam 6. In addition, laser welder can be raised or lowered relative to support surface 8 along a z axis to position laser beam 6 vertically relative to the work. It is not important to this invention which specific methods of imparting relative motion between laser beam 6 and support surface 8 are used.

This invention relates specifically to a pressure foot, indicated generally as 20, carried on laser welder 4 for pressing together the two items being welded only adjacent the weld site, i.e. the point at which laser beam 6 is then directed. Pressure foot 20 provides a small, circular contact area against sheets 9 and 10 such that sheets 9 and 10 are forced into close contact with one another only immediately adjacent the weld site where welding is then taking place. Because pressure foot 20 is physically carried on laser welder 4, the contact area created by pressure foot 20 will move relative to weld line 12 in concert with the relative motion between laser beam 6 and support surface 8. Thus, as laser beam 6 moves relative to weld line 12, the contact area created by pressure foot 20 will also similarly move relative to weld line 12. Accordingly, the only clamping taking place at any given time is that adjacent the weld site.

The items being welded together are not forced into close contact with one another along the remaining portions of weld line 12.

Figure 2:
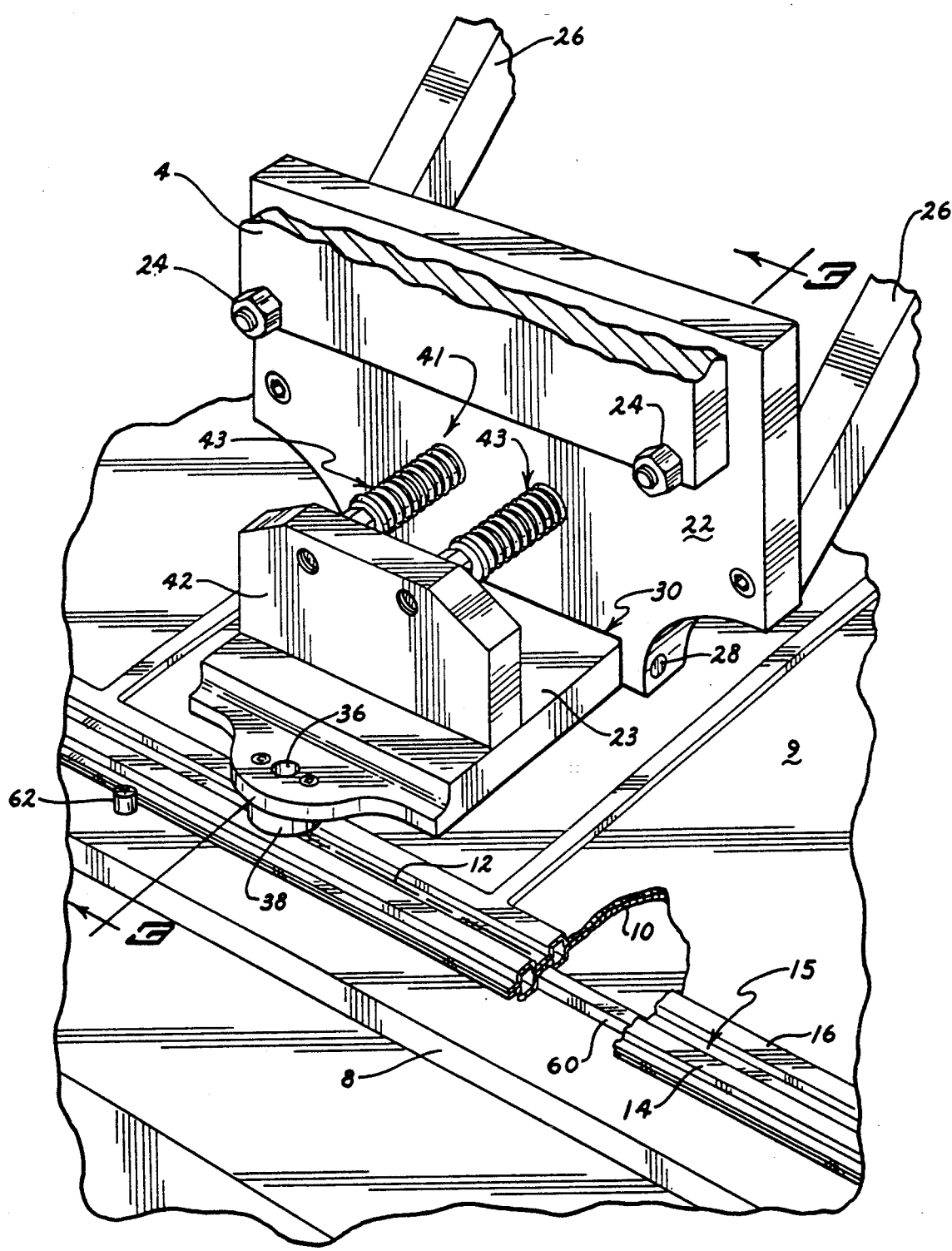
FIG. 2 is a perspective view of an improved laser welding apparatus according to this invention, again illustrating the improved pressure foot of this invention attached to a laser welder to provide close contact between the items to be welded in a contact area only adjacent the weld site.

Referring now to FIGS. 2 and 3, pressure foot 20 is substantially L-shaped having a generally vertical mounting leg 22 with a protruding, horizontal pressure plate 23 adjacent the lower end thereof. Mounting leg 22, which is in the form of a planar, vertical wall or flange, is bolted to the frame of laser welder 4 using threaded securing bolts 24 or other suitable fasteners. Upwardly extending brace arms 26 extend from the rear of mounting leg 22 to be secured to another portion of laser welder 4. Brace arms 26 further attach or secure pressure foot 20 to welder 4 and reinforce mounting leg 22.

The purpose of mounting leg 22 is to attach pressure foot 20 to laser welder 4 so that pressure plate 23 is carried with laser welder 4 during relative motion between laser welder 4 and support surface 8. In performing this function, it is not essential that mounting leg 22 comprise a planar, vertical wall or that any particular type of mounting means be used. All that is required is that pressure foot 20 have some type of means for mounting pressure plate 23 to laser welder 4.

Pressure plate 23 is generally horizontal and is mounted for pivotal rotation about a horizontal pivot axis defined by a pivot rod 28 located at the bottom of mounting leg 22. In this regard, the rear end of pressure plate 23 fits into a notch 30 provided in mounting leg 22 such that mounting leg 22 overlies the rear end of pressure plate 23. The front portion of notch 30 is chamfered slightly upwardly as shown at 32 in FIG. 3. This allows pressure plate 23 to pivot slightly upwardly (shown in phantom lines in FIG. 3) from its lowermost, generally horizontal orientation (shown in solid lines in FIG. 3). The rear portion of notch 30 forms a horizontal stop surface 34 that abuts against the rear end of pressure plate 23 so that pressure plate 23 will not rotate downwardly out of its lowermost, horizontal position. In effect, the abutment of stop surface 34 with pressure plate 23 defines the lowermost, horizontal position of pressure plate 34, and allows pressure foot 20 to be picked up and carried with laser welder 4 when laser welder 4 moves vertically upwardly along the z-axis.

Pressure plate 23 includes a circular aperture 36 which is located on its front end in alignment with laser beam 6. In addition, pressure plate 23 includes a bearing element 38 fixed to its lower surface beneath aperture 36 which bearing element 38 is made of a material which will not melt from the welding plume or mar the items being welded. For example, when welding metallic sheets 9 and 10 made of stainless steel, one suitable bearing element 38 comprises a cylindrical brass bearing. Bearing element 38 also includes a circular passage or opening 40 extending therethrough to allow laser beam 6 to pass downwardly into contact with weld line 12. See FIG. 3.

An adjustable means, indicated generally as 41, is provided for applying downward pressure against pressure plate 23 to rotate pressure plate 23 downwardly relative to mounting leg 22 into its lowermost, horizontal position. It is the pressure of pressure means 41 that is applied to sheets 9 and 10 to force sheets 9 and 10 together along weld line 12 as described hereafter. Any suitable means of forcing pressure plate 23 downwardly could be used. However, one relatively simple pressure means 41 as disclosed herein comprises adjustable spring units 43.

More particularly, pressure plate 23 includes an upstanding flange 42 on its top surface which is parallel to mounting leg 22. Two adjustable spring units 43 extend between mounting leg 22 and flange 42 for pivoting pressure plate 23 downwardly about pivot rod 28 into its lowermost, horizontal orientation. Since spring units 43 are identical, a description of one will suffice to describe the other.

Each spring unit 43 comprises a threaded rod 44 fixedly secured to and projecting out from flange 42 towards mounting leg 22. A strong compression spring 46 has one end received in a cavity 48 on mounting leg 22 to hold that end of spring 46 in place against the face of mounting leg 22. The other end of spring 46 surrounds rod 44 and abuts against a washer 50 which is adjacent a nut 52 on rod 44. Spring 48 is normally compressed between washer 50 and mounting leg 22 so as to create a force that presses outwardly against washer 50 on rod 44, as indicated by the arrows A in FIG. 3, to rotate pressure plate 23 downwardly about pivot rod 28 into its lowermost, horizontal position. The adjustment of the spring pressure can be varied by screwing nut 52 in and out along the length of rod 44 to vary the position of washer 50, and hence the compression of spring 46.

Turning now to the operation of the welding method and apparatus of this invention, support surface 8 includes an upwardly directed rail 60 which extends along the desired track of weld line 12. See FIGS. 2 and 3. Metallic sheets 9 and 10 are first stacked or superimposed on top of one another and are then merely laid in place on top of support surface 8. Support surface 8 serves merely as an underlying backing member for sheets 9 and 10. In this orientation, the upwardly extending rail 60 engages against lowermost sheet 10 and is received in channel 15 to closely underlie weld line 12. Support surface 8 can include upright jig pins 62 for engaging against the peripheral edges of sheets 9 and 10 to further help align sheets 9 and 10 on support surface 8.

Laser welder 4 is then lowered into a working position in which laser beam 6 is directed downwardly towards channel 15 in top sheet 9. This working position of laser welder 4 is chosen to be sufficiently low such that pressure foot 20 engages against top sheet 9 and is pivoted at least incrementally up out of its lowermost horizontal position such that the force provided by the adjustable pressure means 41 is applied against sheets 9 and 10 to force such sheets together and against support surface 8. In other words, laser welder 4 is lowered enough so that pressure plate 23 has bearing element 38 engaged against top sheet 9 with the force of spring units 43 being effectively applied through bearing element 38 to top sheet 9. Thus, a small, cylindrical contact area is formed with sheets 9 and 10 by bearing element 38. This contact area closely surrounds laser beam 4.

In this regard, if the lowermost position of plate 23 is perfectly horizontal, then pressure plate 23 will be rotated slightly upwardly out of this horizontal position when positioned by laser welder 4 in order to bring the force of pressure means 41 to bear on sheets 9 and 10. Alternatively, the lowermost position of plate 23 could be inclined slightly downwardly from the horizontal by a suitable slight inclination in the angle of stop surface 34. In this event, when laser welder 4 positions plate 23 against sheets 9 and 10 and rotates it slightly upwardly to engage the force of pressure means 41, pressure plate 23 will have a perfectly horizontal orientation in this working position. Thus, the lowermost orientation of plate 23 on mounting leg 22 is only "generally" horizontal as described above.

Welding is then allowed to take place in a normal manner by relatively moving laser welder 4 with respect to support surface 8 to cause laser beam 6 to follow weld line 12. Pressure foot 20 travels with laser welder 4 in this relative motion so that sheets 9 and 10 are pressed tightly together only at the weld site. No other clamps are needed at any other spots on sheets 9 and 10. When welding is finished after weld line 12 has been entirely traversed by laser welder 4, the laser welder 4 is simply lifted up off of support surface 8 and the now joined sheets 9 and 10 may be removed without having to release any clamps. The process may then be repeated with two new sheets 9 and 10.

The movable mounting of pressure plate 23 on mounting leg 22 is preferred because the items being welded do not always lie completely flat along weld line 12. They may undulate to some degree due to variations in material thickness and flatness or because the upper surface of rail 60 may have a slight undulation in it. Thus, as laser welder 4 traverses along the length of weld line 12, pressure plate 23 can slightly pivot upwardly about pivot rod 28 when required due to any undulations in weld line 12. When the undulations are not present, pressure plate 23 will return to its working position as set by the position of laser welder 4.

Laser welding apparatus 2 of this invention provides a much simpler and more effective way of clamping or forcing together the items 9 and 10 being welded. The many separate clamps for clamping around the periphery of sheets 9 and 10 as used in the prior art, and the time involved in setting up and releasing these clamps for each set of sheets 9 and 10, are no longer needed. Now, only the single pressure foot 20 is required which foot 20 is mounted to move with laser welder 4 relative to support surface 8. This creates a contact area along weld line 12 having sufficient pressure to force these sheets together into close contact just where it is needed, i.e. at the weld site where the weld is being made at that particular point in time by laser beam 6. Accordingly, it is much simpler and less complex to set up apparatus 2 for welding, and a better weld is formed due to the close contact between sheets 9 and 10 provided by pressure foot 20 at the weld site. The pressure foot 20 by providing close intimate contact between the sheets helps ensure a hermetic (i.e. airtight) weld along the length of weld line 12. This close intimate contact is critical to achieve the necessary heat transfer to the bottom sheet or substrate that is needed to create a good, hermetic weld.

In addition, pressure foot 20 has a known geometrical relationship to laser welder 4 and when mounted thereon in a fixed manner can have the apertures 36 and 40 through which beam 6 passes precisely located relative to the direction of laser beam 6. This allows the size of such apertures 36 and 40 to be minimized, causing the contact area provided by pressure foot 20 to closely surround laser beam 6. Moreover, the pressure which forces sheets 9 and 10 together is provided entirely by the adjustable pressure means 41 on pressure foot 20. This pressure means 41 can be easily and quickly adjusted without varying the location of laser welder 4 along the z-axis. All that is required is that the laser welder 4 be moved sufficiently close to support surface 8 so that pressure foot 20 is pivoted at least incrementally upwardly out of its lowermost, generally horizontal position so that the pressure means 41 is effective in pressing sheets 9 and 10 together.

The aperture 36 in pressure plate 23 and the opening 40 in bearing element 38 create an enclosed chamber around laser beam 6 as it contacts the weld site. In this regard, opening 40 in bearing element 38 is preferably narrowed or necked inwardly over its lower portion, as shown at 41 in FIG. 3, to more closely surround laser beam 6 immediately adjacent the weld site. This allows the shielding gasses typically used around beam 6 in welder 4, e.g. inert gasses such as nitrogen or argon, to be confined at the weld site and prevents such gasses from being quickly dispersed. This leads to a better and more perfect weld with less oxide formation. This is particularly important where the finished product is submersed in water, such as the heat exchange cooling fins previously described, since oxide rich weld areas are more susceptible to corrosion. Thus, a weld line with as few oxides as possible is preferred. Applicants have found that the apertured pressure foot 20, which serves to better confine the shielding gasses to the weld site area, provides a weld line 12 that is more oxide free.

Various modifications of this invention would be apparent to those skilled in the art. For example, the use of rail 60 on support surface 8 is needed to provide a backing member that closely underlies or backs the underside of weld line 12, and is required due to the channeled configuration of sheets 9 and 10 along weld line 12. However, such a rail could be dispensed with if sheets 9 and 10 are flat along weld line 12. In this event, sheets 9 and 10 could be laid on a purely flat support surface 8. In addition, bottom sheet 10 can be quite thick or rigid and may be much thicker than top sheet 9.

In addition, while a pivotal mounting of pressure plate 23 is shown herein, it would be possible to have a pressure plate 23 that moves purely vertically towards and away from sheets 9 and 10, with spring units 43 extending vertically from the top side of plate 23 to a horizontal mounting flange or abutment. In this arrangement, pressure plate 23 could move vertically up and down on some support rods or rails. Some type of stop means would still be required to provide a lowermost orientation for pressure plate 23 relative to its mounting structure. Otherwise, laser welder 4 would not be able to pick pressure foot 20 up off the work when it is moved upwardly in the z-axis. Accordingly, this invention is to be limited only by the appended claims.

We claim:

1. A method of laser welding at least two metallic items together along an elongated weld line, which comprises:
   (a) projecting a laser beam from a laser welder in a first direction such that the laser beam serves as an energy source for welding the items together at a point at which the laser beam contacts the items;
   (b) positioning a support surface relative to the laser welder such that the laser beam is directed towards the support surface when the laser beam is projected in its first direction;
   (c) superimposing the items at least partially on top of one another such that the items are overlapped along the elongated weld line;
   (d) placing the superimposed items to be welded together against the support surface without clamping the items to the support surface such that the support surface simply provides a backing member against which the superimposed items can be pressed;
   (d) continuously moving the laser beam and the support surface relative to one another at a selected speed such that the point of contact between the items and the laser beam continuously moves along the elongated weld line to weld the items together along the length of the weld line and thereby form an elongated weld line which is longer than the weld line that could be formed by a stationary laser beam; and
   (e) firmly pressing the superimposed items against the support surface only in a small contact area immediately adjacent the laser beam and moving this contact area in concert with and at the same selected speed as the relative motion between the laser beam and the support surface to force the items being welded into intimate contact with one another only adjacent a weld site comprising the point at which the laser beam is contacting the weld line at any given point in time.

2. The method of claim 1, further comprising the steps of:
   (a) flowing shielding gasses downwardly around the laser beam; and
   (b) confining the shielding gasses in a small chamber located around the weld site to minimize the formation of oxides in the weld.

3. An improved apparatus for laser welding at least two metallic items which are at least partially superimposed on top of one another to be overlapped along an elongated weld line, the apparatus being of the type having a laser welder which projects a laser beam in a first direction against a support surface upon which the metallic items being welded are supported with the support surface being generally perpendicular to the first direction of the laser beam; means for imparting relative motion between the support surface and the laser beam to allow the laser beam to move along the elongated weld line to weld the items together along the length of the weld line; and means for clamping the metallic items against the support surface to provide intimate contact between the items along the weld line, wherein the improvement relates to the clamping means and comprises:
   means for pressing the superimposed metallic items firmly against the support surface in a contact area adjacent the laser beam to force the items being welded into intimate contact with one another adjacent a weld site comprising the point at which the laser beam is then contacting the weld line, further including spring means for biasing the pressing means towards the support surface to press the metallic items against the support surface with a predetermined pressure, and wherein the biasing force provided by the spring means is adjustable to vary how tightly the metallic items are forced together along the weld line, and wherein the pressing means is carried on the laser welder to be movable in concert with the relative motion between the laser welder and the support surface such that the contact area provided by the pressing means traverses over the elongated weld line as the relative motion between the laser welder and the support surface occurs.

4. The apparatus of claim 3, wherein the spring means comprises at least one compression spring extending between the pressing means and a fixed abutment.

5. The apparatus of claim 4, wherein the pressing means includes an elongated threaded rod around which a first end of the compression spring is received, the other end of the compression spring being engaged against the fixed abutment, and wherein the threaded rod carries a threaded adjustment member thereon against which the first end of the compression spring is abutted, the threaded adjustment member being selectively movable along the length of the threaded rod to vary the amount of compression in the compression spring to vary the force being exerted on the pressing means by the compression spring.

6. The apparatus of claim 5, wherein the abutment comprises a surface on a mounting member used to secure the pressing means to the laser welder, and further including stop means extending between the mounting member and the pressing means for defining a lowermost position of the pressing means on the mounting member.

7. An improved apparatus for laser welding at least two metallic items which are at least partially superimposed on top of one another to be overlapped along an elongated weld line, the apparatus being of the type having a laser welder which projects a laser beam in a first direction against a support surface upon which the metallic items being welded are supported with the support surface being generally perpendicular to the first direction of the laser beam; means for imparting relative motion between the support surface and the laser beam to allow the laser beam to move along the elongated weld line to weld the items together along the length of the weld line; and means for clamping the metallic items against the support surface to provide intimate contact between the items along the weld line, wherein the improvement relates to the clamping means and comprises:

means for pressing the superimposed metallic items firmly against the support surface in a contact area adjacent the laser beam to force the items being welded into intimate contact with one another adjacent a weld site comprising the point at which the laser beam is then contacting the weld line, and wherein the pressing means is carried on the laser welder to be movable in concert with the relative motion between the laser welder and the support surface such that the contact area provided by the pressing means traverses over the elongated weld line as the relative motion between the laser welder and the support surface occurs, and wherein the pressing means comprises:

(a) a pressure plate that is carried on the laser welder; and (b) means for biasing the pressure plate towards the support surface to create a predetermined pressure of the pressure plate against the items being welded when such items are laid on the support surface beneath the pressure plate.

8. The apparatus of claim 7, wherein the pressure plate includes a cylindrical bearing element that engages against the superimposed metallic items to apply pressure thereto, and wherein the bearing element has an opening extending therethrough to allow the laser beam to pass through the bearing element to engage the weld line.

9. The apparatus of claim 7, wherein the pressure plate is movably carried on the laser welder to allow the pressure plate to move up and down to accommodate undulations in the items occurring along the weld line.

10. The apparatus of claim 9, wherein the pressure plate is pivotably secured to the laser welder for a pivotal motion about a substantially horizontal pivot axis.

11. The apparatus of claim 10, wherein the pressure plate is pivotably secured to one end of a generally vertical mounting leg which is attached to the laser welder, and wherein the one end of the mounting leg overlies a portion of the pressure plate such that the one end of the mounting leg abuts against said pressure plate portion to form a stop for limiting rotation of the pressure plate to a lowermost, generally horizontal orientation, and wherein the one end of the pressure plate is configured to allow rotation of the pressure plate upwardly about its pivot axis out of its lowermost, generally horizontal orientation.

12. A pressure foot for use with a laser welder for pressing against the items being welded to force such items into close contact with an underlying support surface, the laser welder having a laser beam as the energy source for performing the welding, which comprises:

(a) at least one mounting leg which is fixedly secured to the laser welder;

(b) a pressure plate movably attached to the mounting leg for movement towards and away from the items being welded, the pressure plate having an aperture therein which is located to be in alignment with the laser beam when the mounting leg is secured to the laser welder such that the laser beam can pass down through the pressure plate to reach the weld site;

(c) means operatively connected between the mounting leg and the pressure plate for biasing the pressure plate downwardly with a predetermined force such that the pressure plate can contact the items being welded and force such items together using the predetermined force supplied by the biasing means; and (d) stop means associated with the biasing means for defining a lowermost position of the pressure plate relative to the mounting leg such that upward movement of the laser welder is effective to pick up and remove the pressure plate from the items being welded.

13. The pressure foot of claim 12, wherein the pressure plate is pivotably connected to the mounting leg for rotation about a generally horizontal pivot axis.

14. The pressure foot of claim 13, wherein the mounting leg is generally vertical when attached to the laser welder and the pressure plate extends from a lower end of the mounting leg and is generally horizontal to define an L-shaped pressure foot.

15. The pressure foot of claim 13, wherein the lower end of the mounting leg overlies a rear end of the pressure plate, wherein a rear portion of the lower end of the mounting leg forms a stop surface that abuts against the rear end of the pressure plate to define the stop means, the stop means so formed defining a lowermost, generally horizontal orientation for the pressure plate, and wherein a front portion of the lower end of the mounting leg is chamfered to allow rotation of the pressure plate upwardly about its pivot axis.

16. The pressure foot of claim 17, wherein the biasing means is adjustable to adjust the pressure exerted on the pressure plate.

17. The pressure foot of claim 16, wherein the biasing means comprises at least one spring unit extending between the pressure plate and the mounting leg.

18. The pressure foot of claim 17, wherein the spring unit comprises an adjustable compression spring extending between the pressure plate and the mounting leg.

19. The method of claim 1, further comprising:
(a) providing a stationary support surface;
(b) continuously moving the laser welder relative to the stationary support surface to create the relative motion required in the step of continuously moving the laser beam and the support surface relative to one another; and
(c) attaching to the laser welder a pressing means for creating the contact area such that motion of the laser welder itself moves the pressing means and its contact area along the weld line in concert with the relative motion between the laser beam and the support surface.

* * * * *